United States Patent [19]

Depping et al.

[11] Patent Number: 5,599,875
[45] Date of Patent: Feb. 4, 1997

[54] 2-COMPONENT PAINTS BASED ON UNSATURATED POLYESTERS FOR THE COATING OF WOOD AND WOOD MATERIALS

[75] Inventors: Karl-Dieter Depping; Horst Hintze-Brüning, both of Münster, Germany

[73] Assignee: BASF Lacke + Farben, AG, Muenster-Hiltrup, Germany

[21] Appl. No.: 520,329

[22] Filed: Aug. 28, 1995

Related U.S. Application Data

[63] Continuation of Ser. No. 81,352, filed as PCT/EP91/02334, Dec. 6, 1991 published as WO92/13039, Aug. 6, 1992, abandoned.

[30] Foreign Application Priority Data

Jan. 19, 1991 [DE] Germany .................. 41 01 529.0

[51] Int. Cl.$^6$ ................. C08J 3/00; C08K 3/20; C08L 67/00; B05D 3/02
[52] U.S. Cl. ............. 524/601; 427/372.2; 427/385.5; 427/393; 428/480; 428/481; 428/482; 524/604; 525/10; 525/36; 525/40; 525/41; 525/42; 525/43; 525/49; 528/303
[58] Field of Search ................. 524/601, 604; 525/10, 36, 40, 41, 42, 43, 49; 428/480, 481, 482; 528/303; 427/372.2, 385.5, 393

[56] References Cited

U.S. PATENT DOCUMENTS 2,879,249 3/1959 Raichle et al. ............... 525/49
3,674,727 7/1972 Fekete et al. ............. 525/32.1

*Primary Examiner*—Paul R. Michl
*Assistant Examiner*—Patrick Niland
*Attorney, Agent, or Firm*—Anne Gerry Sabourin

[57] ABSTRACT

Coating compositions and processes for coating wood and wood materials are described. The compositions comprise a first component comprising at least one reactive thinner and at least one unsaturated polyester, and a second component comprising a curing catalyst. The unsaturated polyester of the first component is the reaction product of: (a) a mixture of at least one saturated aliphatic dicarboxylic acid with 6 to 10 carbon atoms and at least one ethylenically unsaturated aliphatic dicarboxylic acid selected from maleic acid, fumaric acid, itaconic acid, citraconic acid, and mixtures thereof; (b) a diol component consisting of at least one of 1,4-dimethylolcyclohexane and substituted dimethylolcyclohexanes, with up to 50 mol % monomeric or oligomeric glycol, based on total moles of the diol component; and (c) up to 10 mol % of a polyol, based on total moles of polyester reactants. The compositions and processes of the invention result in coatings with improved hardness and aged cold crack resistance.

12 Claims, No Drawings ns, if appropriate, on a curing agent component II. Furthermore, the present invention relates to a process for the coating of wood and wood materials and to the use of the coating compositions.

2-COMPONENT PAINTS BASED ON UNSATURATED POLYESTERS FOR THE COATING OF WOOD AND WOOD MATERIALS

This application is a continuation of U.S. Ser. No. 08/081,352, filed as PCT/EP91/02334, Dec. 6, 1991 published as WO92/13039, Aug. 6, 1992, now abandoned.

The present invention relates to coating compositions based on a paint component I which contains one or more unsaturated polyesters, reactive thinners, organic solvents, if appropriate, and, if appropriate, conventional auxiliary substances and additives, and on a curing agent component II. Furthermore, the present invention relates to a process for the coating of wood and wood materials and to the use of the coating compositions.

Coating compositions based on unsaturated polyesters and reactive monomeric compounds are known. It is also generally known that the properties of these coating compositions can be regulated mainly by the choice of the components making up the polyester as well as, if desired, by the method of preparing the polyesters. For example, it is known (cf. for example H. V. Boenig, Unsaturated Polyesters, Structure and Properties, Elsevier Co., Amsterdam, 1964) that it is possible to prepare flexible resins by the use of aliphatic saturated dicarboxylic acids, for example adipic acid, and of ether diols, for example diethylene glycol. However, the compatibility of such resins with styrene is often unsatisfactory and the cured systems possess surfaces which are too soft for subsequent processing. In addition, the so-called condition of the surfaces deteriorates on ageing of the painted areas, i.e. the painted areas fail to retain their high gloss and their low peak-to-valley height (glass-like state) after ageing.

As is known, coating compositions based on unsaturated polyesters are also used for the coating of wood and wood materials. Commercially available products are generally based on polyesters based in turn on aromatic and ethylenically unsaturated carboxylic acids. However, these products are in need of improvement especially as regards resistance to cold cracking.

Coating compositions based on an alkyd resin for the coating of wood or of substrates containing wood fibers are also known from EP-B-113,150. This alkyd resin is made up from 12–75% by weight of an ethylenically unsaturated monocarboxylic acid having 6 to 24 carbon atoms, 10–65% by weight of a saturated dibasic or polybasic cycloaliphatic carboxylic acid having 7 to 11 carbon atoms, 10–45% by weight of a diol or polyol and 0.1–8% by weight of a 2-(2'-hydroxyphenyl)benzotriazole compound and/or a substituted 2-hydroxybenzophenone compound. The drawback of these air-drying systems is the unsatisfactory drying rate at ambient temperature which causes the drying process to take a long time, in turn resulting in film embrittlement. In addition, the film properties, for example gloss and hardness, of the resultant coating compositions are in need of improvement.

Furthermore, EP-A-31,977 discloses coating compositions which contain an unsaturated polyester having an acid value of 5 to 60 mg of KOH/g and an OH value of 0 to 30 mg of KOH/g. The unsaturated polyesters are characterized in that they contain 1 to 25 mol % of terminal 1,2-alkenedicarboxylic acids and in that 1 to 8 mol % of the dicarboxylic acid groups in the polyester chain consist of trans-1,2-alkenedicarboxylic acid groups. However, coating compositions based on these unsaturated polyesters have the drawback that their rates of curing are too low owing to the low functionality at activated double bonds.

Moreover, EP-A-31,977 contains no information on either the use of these systems for the coating of wood or on the cold cracking characteristics of the resultant coatings.

Furthermore, German Patent 3,613,083 discloses coating compositions which, compared with the conventional systems, provide coatings having improved flexibility and resistance to cold cracking. This is achieved by the use of linear polyesters having alkyl side chains, saturated polyesters preferably being used. The use of corresponding unsaturated linear polyesters in coating compositions is possible only to a limited degree, since the hydrophobic side chains lower the compatibility of the overall system with styrene. Moreover, the condition of the resultant painted surfaces is unsatisfactory.

Furthermore, it is known from German Offenlegungsschrift 1,918,061 that the use of cyclic, olefinically unsaturated dicarboxylic acids of the tetrahydrophthalic acid type in polyesters is responsible for the fact that coatings based on these polyesters have good sandability and polishability due to the satisfactory curing of the coats. It is a drawback of these coatings, however, that so-called 'stratification' occurs on sanding and polishing, i.e. the individual coats of the paint system become marked and visually noticeable.

Accordingly, the object of the present invention is to provide coating compositions which allow the production of thick, polishable and sandable coatings on wood and wood materials. They should also be suitable in particular for the coating of wood and wood materials exposed to considerable temperature fluctuations (temperatures between −15° and +40° C.) on further processing, storage or use. This means that the resultant coatings should have as high a resistance to cold cracking as possible. In addition, the coatings should possess a high degree of surface hardness, a high degree of gloss (>60°) and a good visual appearance. Furthermore, they should be sandable and polishable without the occurrence of so-called 'stratification'.

Surprisingly, this object is achieved by coating compositions based on a paint component I which contains one or more unsaturated polyesters, reactive thinners, organic solvents, if appropriate, and, if appropriate, conventional auxiliary substances and additives, and on a paint component II which contains a curing catalyst. These coating compositions are characterized in that the paint component I contains at least one unsaturated polyester (A) which can be obtained from a) 33 to 67 mol % of a mixture of
   $a_1$) 30 to 90 mol % of at least one ethylenically unsaturated aliphatic dicarboxylic acid and
   $a_2$) 10 to 70 mol % of at least one saturated aliphatic dicarboxylic acid having 6 to 10 carbon atoms per molecule, b) 33 to 67 mol % of a mixture of
   $b_1$) 50 to 100 mol % of at least one cyclohexane derivative substituted in the 1,4-position by methylol groups and
   $b_2$) 0 to 50 mol % of at least one monomeric and/or oligomeric glycol having 2 or 3 carbon atoms per glycol segment and a number average molecular weight $M_n \leq 500$
and c) 0 to 10 mol % of at least one polyol, with the proviso that the sum of the amounts of the components a to c, the sum of the amounts of the components $a_1$ and $a_2$ and the sum of the amounts of the components $b_1$ and $b_2$ is in each case 100 mol %.

The present invention further relates to processes for the coating of wood and wood materials using these coating compositions and to the use of these coating compositions for the coating of wood and wood materials, especially for the coating of materials exposed to temperature fluctuations in further processing, storage or use.

It is surprising, and could not have been foreseen, that the coating compositions according to the invention allow the production of thick-film paint systems on wood and wood materials which are readily sandable and polishable without the individual coats of the paint structure becoming noticeable, have a high degree of hardness, a good degree of gloss and good scratch resistance. The coating compositions are particularly distinguished by good resistance of the coatings to cold cracking and thus allow the use of these paints for the coating of materials exposed to considerable temperature fluctuations in further processing, storage and use. The individual components of the coating compositions according to the invention will first be elucidated in greater detail in the text below.

The paint component I contains, as a component essential to the invention, an unsaturated polyester which is synthesized from
a) 33 to 67 mol %, preferably 50 to 60 mol %, of dicarboxylic acids,
b) 33 to 67 mol %, preferably 40 to 50 mol %, of diols and
c) 0 to 10 mol %, preferably 0 to 5 mol %, of polyols, the dicarboxylic acid component being a mixture of
  $a_1$) 30 to 90 mol %, preferably 50 to 70 mol %, of at least one ethylenically unsaturated aliphatic dicarboxylic acid and
  $a_2$) 10 to 70 mol %, preferably 30 to 50 mol %, of at least one saturated aliphatic dicarboxylic acid having 6 to 10 carbon atoms per molecule,
and the diol component b being a mixture of
  $b_1$) 50 to 100 mol %, preferably 70 to 100 mol %, of at least one cyclohexane derivative substituted in the 1,4-position by methylol groups and
  $b_2$) 0 to 50 mol %, preferably 0 to 30 mol %, of at least one monomeric and/or oligomeric glycol having 2 or 3 carbon atoms per glycol segment and having a number average molecular weight $M_n \leq 500$, preferably $M_n \leq 200$,
with the proviso that the sum of the amounts of the components $a_1$ and $a_2$, the sum of the amounts of the components $b_1$ and $b_2$ and the sum of the amounts of the components a to c is in each case 100 mol %.

Any ethylenically unsaturated aliphatic dicarboxylic acid, for example maleic acid, fumaric acid, itaconic acid and citraconic acid as well as mixtures of these dicarboxylic acids, is suitable as component $a_1$. Maleic acid and/or fumaric acid is preferably used, fumaric acid being particularly preferred. These acids can be used in the form of the free acids or of their derivatives capable of esterification (e.g. anhydrides) or of their derivatives capable of transesterification (e.g. methyl esters). Fumaric acid or fumaric acid derivatives in particular can be used in the form of the isomeric maleic acid or maleic acid derivatives and can be isomerized to fumaric acid or fumaric acid derivatives during the polyester synthesis at elevated temperatures.

Any saturated aliphatic dicarboxylic acid having 6 to 10 carbon atoms per molecule, for example adipic acid, pimelic acid, suberic acid, acelaic acid and sebacic acid, as well as mixtures of these dicarboxylic acids, is suitable as component $a_2$. Adipic acid is preferably used. These acids can be used in the form of the free acids or of their derivatives capable of transesterification (e.g. methyl esters) or of their derivatives capable of esterification (e.g. anhydrides).

Cyclohexane derivatives substituted in the 1,4-position by $CH_2OH$ groups are suitable as component $b_1$, 1,4-dimethylolcyclohexane preferably being used. 1,4-Dimethylolcyclohexanes substituted by alkyl groups are also suitable.

Examples of suitable monomeric or oligomeric glycols having 2 to 3 carbon atoms per glycol segment and a number average molecular weight $\leq 500$, preferably $\leq 200$ (component $b_2$) are ethylene glycol, propylene 1,2-glycol, propylene 1,3-glycol, diethylene glycol, dipropylene glycol, triethylene glycol, tetraethylene glycol etc. Diethylene glycol, dipropylene glycol and triethylene glycol are preferably used.

Polyols, in particular triols, for example glycerol, trimethylolpropane, trimethylolethane, pentaerythritol, ditrimethylolpropane, diglycerol and derivatives thereof obtainable by alkoxylation, preferably ethoxylation and propoxylation, as well as mixtures of these compounds, are suitable as component c. Trimethylolpropane and alkoxylated trimethylolpropane having a number average molecular weight $M_n \leq 1000$ are preferably used.

These unsaturated polyesters can be prepared by the usual methods (cf. for example Houben Weyl, Methoden der organischen Chemie [Methods of Organic Chemistry], 4th Edition, Volume 14/2, Georg Thieme Verlag, Stuttgart 1961). They usually have acid values between 10 and 60 mg of KOH/g, preferably between 30 and 50 mg of KOH/g, and OH values between 5 and 100 mg of KOH/g, preferably between 25 and 40 mg of KOH/g. The number average molecular weights of these polyesters are generally between 800 and 2000.

The unsaturated polyesters (component A) are usually used in the coating compositions according to the invention in an amount of 35 to 60% by weight, preferably of 41 to 54% by weight, in each case based on the total weight of the paint component I.

In addition to the unsaturated polyester A, the coating compositions according to the invention can also contain further ethylenically unsaturated polymeric compounds (component B). Other unsaturated polyesters are used in particular. These unsaturated polyesters may be linear or branched and are synthesized on the basis of various aliphatic, cycloaliphatic and aromatic dicarboxylic and polycarboxylic acids and diols and polyols.

Unsaturated linear polyesters having alkyl side chains are used for preference as component B. These polyesters can be prepared, for example, by a method similar to that prescribed in German Patent 3,613,083, by using corresponding ethylenically unsaturated structural components. Using linear unsaturated polyesters having alkyl side chains in the given ratio to the component A has the advantage that it is possible to incorporate waxes into the paint system and the paint films are more hydrophobic and flexible.

Mixtures of various unsaturated polyesters can of course also be used.

The component B is usually used in the coating compositions according to the invention in an amount of 0 to 20% by weight, preferably 5 to 15% by weight, in each case based on the total weight of the paint component I. The mixing ratio of the component A to the component B is preferably between 6:1 and 3:1.

As a further component (component C), the coating compositions according to the invention contain at least one reactive thinner, preferably in an amount of 29 to 50% by weight, based in each case on the total weight of the paint component I.

Suitable reactive thinners are ethylenically unsaturated compounds, in particular vinylaromatic compounds, for example styrene, vinyltoluene, t-butylstyrene, divinylbenzene, α-methylstyrene, chlorostyrenes, bromostyrenes, vinylpyridine, vinylnaphthalene and the like, vinyl esters of carboxylic acids having 2 to 6 carbon atoms, for example vinyl acetate, vinyl propionate, vinyl pivalate, allyl phthalate, diallyl phthalate, trialkyl cyanurate, triallyl isocyanurate, alkyl acrylates, alkyl methacrylates, alkanediol di(meth)acrylates and the like. Mixtures of various reactive thinners are also suitable. Vinylaromatic compounds are used for preference and of these styrene and a mixture of styrene and vinyltoluene are particularly preferred.

The coating compositions according to the invention can also contain an organic solvent (component D). The paint component I usually contains 0 to 15% by weight, preferably to 2 to 5% by weight, based on the total weight of the paint component I, of solvent.

Examples of suitable solvents are aliphatic, cycloaliphatic and aromatic hydrocarbons, in particular various petroleum spirits as well as esters and alcohols. These solvents are known to a person skilled in the art and therefore they need not be described here in greater detail.

Furthermore, the coating compositions according to the invention also usually contain 0 to 7% by weight, preferably 1.5 to 5% by weight, in each case based on the total weight of the paint component I, of pigments and/or fillers (component E). Both organic and inorganic pigments are suitable, for example aniline black and CI Pigment Black 1. The fillers used are, for example, talc, mica, barium sulfate, silicates and the like, silicic acid being preferably used in the case of coating compositions for musical instruments.

Finally, the coating compositions usually also contain 1.0 to 4.0% by weight, preferably 1.0 to 2.0% by weight, in each case based on the total weight of the paint component I, of further auxiliary substances and additives. Of these, paraffin waxes may be mentioned in particular. They are mixtures of a purified, predominantly straight-chain hydrocarbon of the general formula $C_nH_{2n+2}$ with a maximum oil content of 0.5 to 3% according to DIN-ISO 2908.

Waxes having a melting range between 44° and 48° C. and/or waxes having a melting range between 52° and 54° C. are preferred.

The mixing ratio of the paraffins having a melting range between 52° and 54° C. to those having a melting range between 44° and 48° C. is usually between 1:1 and 2:3. Other auxiliary substances and additives which can be used are accelerators, for example derivatives of aceto-acetic acid, and polymerization inhibitors, for example hydroquinones, methylhydroquinones and benzoquinones.

The coating composition according to the invention contains as a further component a curing agent component II. This curing agent component II usually consists of an accelerator component II-1 and a curing component II-2.

The accelerator component II-1 usually contains organic solvents in customary amounts, preferably 50 to 90% by weight, based on the weight of the accelerator component II-1. The solvent content and hence the processing viscosity of the coating composition according to the invention can of course also be regulated by the solvent content of this accelerator component II-1. Suitable solvents are the solvents already listed in the description of the paint component I.

In addition, the accelerator component II-1 contains driers in customary amounts, preferably 10 to 50% by weight, based on the weight of the accelerator component II-1. Examples of suitable driers are metal salts of (cyclo)aliphatic, natural or synthetic acids, for example metal salts of linoleic acid, naphthenic acid, octanoic acid or 2-ethylhexanoic acid, suitable metals being cobalt, manganese, lead, zirconium, calcium, zinc and bismuth. Mixtures of driers are preferably used.

The curing agent component usually contains customary amounts of organic solvents, plasticizers, peroxides and, if desired, water. The curing agent components II-2 preferably contain 0 to 90% by weight, particularly preferably 70 to 85% by weight, of organic solvents, and, preferably, 3 to 60% by weight of plasticizers, 6.5 to 40% by weight of peroxide and 0 to 1% by weight of water.

Examples of suitable organic solvents are the solvents already listed in the description of the paint component I.

Examples of suitable plasticizers are the alkyl esters of phthalic acid, for example dimethyl phthalate, diethyl phthalate, dibutyl phthalate, dihexyl phthalate, dioctyl phthalate and other conventionally used plasticizers which are compatible with the coating composition. Examples of suitable peroxides are in particular organic peroxides, for example cyclohexanone peroxide and methyl ethyl ketone peroxide or combinations of the two.

The accelerator component II-1 and the curing agent component II-2 are normally stored separately and are mixed with the paint component I (3-component paint), or the accelerator component II-1 is added directly to the paint component I and the curing agent component II-2 is added (mechanically or manually) shortly before application.

The paint component I as well as the accelerator component II-1 and the curing agent component II-2 are mixed in such a proportion that the pot life (time during which the mixture is workable) is preferably between 5 and 10 min. and the gel time after application of the coating composition is between 8 and 12 min. Preferred coating compositions are obtained when the accelerator component II-1 is used in an amount of 0.5 to 5.0% by weight, based on 100 parts by weight of the paint component I. The metal content of the coating composition is preferably between 0.1 and 2.0%, based on the weight of the paint component I. The curing agent component II-2 is preferably used in such an amount that the amount of peroxide is 0.5 to 2.0% by weight, based on the weight of the paint component I. Other proportions of the accelerator component II-1 and the curing agent component II-2 can advantageously be used, depending on the choice of binders, driers and curing agent components.

The preparation of the paint component I and the curing agent component II is carried out in the normal manner by mixing and, if appropriate, dispersing. Occasionally it is advisable first to dissolve one component in a solvent and to mix this solution with the other components. To incorporate the pigments, the various pigments can either be ground together with the binder or the paint component I is used as stock paint material for a pigment paste.

The coating compositions can be applied by spraying, pouring, flow coating, dipping, brushing, blade coating or rolling, preferably spraying and pouring, the film being subsequently cured at ambient temperature. The gelling of the applied film preferably takes place over a period of 8 to 12 min.

There is of course also the possibility of curing the coating compositions with the aid of radiation, in particular UV or electron radiation, in which case the corresponding initiators must be chosen as the curing agent component II.

The coating compositions are usually applied to form a dry film thickness of 600 to 1000 μm, preferably of 700 to 800 μm, but they can be applied with a different film thickness depending on the use envisaged.

The coating compositions according to the invention are particularly suitable for the coating of wood and wood materials, for example chipboard and the like. However, they can also be applied to other substrates, for example metal, glass, plastics, paper etc. Because of the high resistance to cold cracking of the resultant coatings, the coating compositions are particularly suitable for the coating of materials exposed to considerable temperature fluctuations (from −15° to 40° C.) in further processing, storage or use.

Typical areas of application of the coating compositions according to the invention are the finishing of musical instruments made of wood, in particular pianos, the finishing of furniture and wooden instrument panels, dashboards and the like in automobiles.

The invention is explained in greater detail in the text below with reference to working examples. All parts and percentages are by weight, unless expressly stated otherwise.

1. Preparation of the unsaturated polyesters 1 and V1 to V7

The polyesters are prepared in a temperature-controllable 3 l reaction vessel fitted with a stirrer, heated packed column, thermal element and nitrogen inlet as follows:

The raw materials listed in Table 1 are weighed in an atmosphere of nitrogen and heated to 150° C. The exothermic reaction which may occur on the addition of the dicarboxylic anhydrides is allowed to subside and the reaction mixture is heated to 200° C. over 5 h. When an acid value of the polyester of 65 to 70 mg of KOH/g is reached, the temperature is raised to 215° C. over 4 h. The polycondensation is carried out at 215° C. until the following characteristics are attained, care being taken that during the entire synthesis of the polyesters the temperature at the head of the column does not exceed 100° C.:

| Polyester | Acid value [mg of KOH/g] | Viscosity[1] [dPas] |
|---|---|---|
| 1 | 48 | 8.6[2] |
| V1 | 47 | 6.9[2] |
| V2 | 45 | 6.0[2] |
| V3 | 48 | 6.2[3] |
| V4 | 45 | 2.8[3] |
| V5 | 48 | 8.6[3] |
| V6 | 37 | 6.7[2] |
| V7 | 51 | 2.3[2] |

[1] measured using the ICI plate-cone viscometer at 23° C.
[2] 65% strength solution in propylene glycol monomethyl ether
[3] 60% strength solution in propylene glycol monomethyl ether On reaching the characteristics, the reaction mixture is cooled to 100° C., treated with 0.02% of hydroquinone, based on the weight of the reaction mixture, and dissolved in styrene (1 h, 130° C.) to a solids content of 60±5%. The resultant polyester resin solutions have the following characteristics:

| Polyester | Acid value [mg of KOH/g] | Solids content [%] | Viscosity [dPas] |
|---|---|---|---|
| 1 | 42 | 60 | 4.4 |
| V1 | 46 | 65 | 8.5 |
| V2 | 45 | 60 | 3.3 |
| V3 | 47 | 58 | 3.2 |
| V4 | 47 | 61 | 3.1 |
| V5 | 46 | 60 | >10 |
| V6 | 32 | 57 | 1.9 |
| V7 | 46 | 60 | 2.8 |

[1] measured using the ICI plate-cone viscometer at 23° C. without further dilution 2. Preparation of a side chain-modified unsaturated polyester 2

13.5 parts of first fraction coconut fatty acid and 12.5 parts of trimethylolpropane are heated in the reaction vessel described in 1. to 190° C. until an acid value of <15 mg of KOH/g is reached. The reaction mixture is then cooled to 115° C., and 13.0 parts of propylene glycol, 15.6 parts of maleic anhydide and 14.0 parts of phthalic anhydride are then added. The reaction mixture is heated to 215° C. over 8 h and kept at this temperature until the acid value of the polyester is 55 mg of KOH/g and the viscosity of a 65% strength solution of the polyester in propylene glycol monomethyl ether is 6.8 dPas (measured using the ICI plate-cone viscometer at 23° C.). The reaction mixture is cooled to 100° C., treated with 0.01% of hydroquinone, based on the weight of the reaction mixture, and dissolved in styrene (1 h, 130° C.) to a solids content of 65%. The polyester resin solution obtained in this manner has a viscosity of 6.5 dPas (measured as a 60% strength solution in styrene at 23° C. using the IC plate-cone viscometer).

EXAMPLE 1

A paint component I-1 was prepared from the components listed in Table 2 by mixing and, if appropriate, dispersing of the components. The styrene of the polyester resin solutions 1, 2 and V1 to V7 is contained in the amounts of styrene shown in Table 2.

To prepare the coating composition 1, 0.5% by weight, based on the weight of the paint component I-1, of a cobalt naphthenate solution II-1-1 in toluene (metal content of the solution 1.6%) were added to 100 parts of the paint component I-1. In addition, 10% by volume, based on the volume of the paint component I-1, of a curing agent solution II-2-1 were added. This curing agent solution II-2-1 contains 14% by weight, based on the weight of the curing agent solution II-2-1, of cyclohexanone peroxide, inhibited with 10% of water, based on the weight of the cyclohexanone peroxide. The active oxygen content of the curing agent solution II-2-1 is 13%. In addition, the curing agent solution II-2-1 contains 6% by weight of dibutyl phthalate, based on the weight of the curing agent solution, and 80% by weight of ethyl acetate as solvent.

To prepare test panels, chipboards 300×200×10 mm in size, faced with Macore veneer, were first pretreated with a commercial black pigment filler based on unsaturated polyester resins containing allyl groups. Both sides of the chipboards were coated with the filler in several coats, allowing each intermediate coat to gel to a dry film thickness of 350 μm. The curing of the filler was carried out at room temperature over a period of 3 days, care being taken that the temperature did not exceed +21° C. The test panels prepared in this way were sanded using 180 grade sandpaper.

The coating composition was applied to the test panels, pretreated in this manner, in three stages, with intermediate gelling for a period of 8 to 12 min. to a total dry film thickness of 600 to 700 μm, and cured by being stored at ambient temperature for a period of 10 days. The surfaces were then sanded and buffed or polished using traditional methods. They were then subjected to the tests listed in Table 3. The test results are also given in Table 3.

Comparison Examples 1 to 7

The paint components I-V1 to I-V7 were prepared from the components listed in Table 2 by mixing and, if appropriate, dispersing of the components. 100 parts of each of the paint components I-V1 to I-V7 were treated, in the same manner as in Example 1, with 0.5% by weight of the cobalt naphthenate solution II-1-1 (metal content 1.6%) and 10% by volume of the curing agent solution II-2-1 described in Example 1, all percentages referring to the paint component I.

The coating compositions V1 to V7 obtained in this manner were applied, in the same manner as in Example 1, to the test panels pretreated as described in Example 1. The curing of the coating compositions V1 to V7 and the testing of the resultant coatings was also performed in the same manner as Example 1. The test results are listed in Table 3.

TABLE 1

Molar composition of the polyesters 1 and V1 to V7

|  | 1 | V1 | V2 | V3 | V4 | V5 | V6 | V7 |
|---|---|---|---|---|---|---|---|---|
| DEG | — | — | 0.93 | — | 0.93 | — | — | 0.93 |
| PG | — | 0.98 | — | — | — | — | — | — |
| DMC | 0.93 | — | — | 0.93 | — | 0.93 | 0.93 | — |
| ADA | 0.4 | — | — | — | — | — | — | 0.4 |
| PA | — | 0.33 | — | — | — | — | — | — |
| PRIPOL | — | — | — | — | — | — | 0.4 | — |
| CHDA | — | — | — | — | 0.4 | 0.4 | — | — |
| HHPA | — | — | 0.4 | 0.4 | — | — | — | — |
| MA | 0.6 | 0.67 | 0.6 | 0.6 | 0.6 | 0.6 | 0.6 | 0.6 |
| TMP | 0.03 | — | 0.03 | 0.03 | 0.03 | 0.03 | — | — |

Key to abbreviations in Table 1:
DEG = diethylene glycol
PG = 1,2-propylene glycol
DMC = 1,4-dimethylolcyclohexane
ADA = adipic acid
PA = phthalic anhydride
PRIPOL1013 = commercial dimeric fatty acid from Unichema having an acid value of 195 to 198 mg of KOH/g
CHDA = cyclohexanedicarboxylic acid
HHPA = hexahydrophthalic anhydride
MA = maleic anhydride
TMP = trimethylolpropane

TABLE 2

Composition of the paint components I-1 and I-V1 to I-V7 in parts

| Example | 1 | V1 | V2 | V3 | V4 | V5 | V6 | V7 |
|---|---|---|---|---|---|---|---|---|
| Solvent[1] | 5.5 | 5.5 | 5.5 | 5.5 | 5.5 | 5.5 | 5.5 | 5.5 |
| Vinyltoluene | 5 | 5 | 5 | 5 | 5 | 5 | 5 | 5 |
| Styrene[2] | 40.5 | 36.3 | 39.5 | 36.9 | 37 | 47.5 | 37.6 | 40.5 |
| UP resin 2[3] | 9.8 | 9.8 | 9.8 | 9.8 | 9.8 | 9.8 | 9.8 | 9.8 |
| Polyester 1 and V1 to V7[3] | 39.7 | 43 | 39.7 | 38.4 | 40.3 | 39.7 | 37.7 | 39.7 |
| Wax[4] | 0.5 | 0.5 | 0.5 | 0.5 | 0.5 | 0.5 | 0.5 | 0.5 |
| Silicic acid[5] | 2.1 | 2.1 | 2.1 | 2.1 | 2.1 | 2.1 | 2.1 | 2.1 |
| Pigment[6] | 1.6 | 1.6 | 1.6 | 1.6 | 1.6 | 1.6 | 1.6 | 1.6 |

Notes on Table 2:
[1] mixture of 64% of ethyl acetate, 27% of petroleum spirit, 8% of toluene and 1% of ethanol
[2] total amount, inclusive of the amount of styrene in the polyester resin solutions
[3] based on pure polyester resin, i.e. without styrene
[4] 10% strength solution of a mixture of 6 parts of commercial paraffin wax having a melting range of 52 to 54° C. and 4 parts of a commercial paraffin wax having a melting range of 44 to 48° C., dissolved in toluene
[5] commercial silicic acid having a primary particle size of 7 μm
[6] aniline black

TABLE 3

| Test results | 1 | V1 | V2 | V3 | V4 | V5 | V6 | V7 |
|---|---|---|---|---|---|---|---|---|
| König pendulum hardness (s) | 63 | 100 | 83 | 80 | 94 | 71 | 7 | 20 |
| Sandability[1] | 3 | 3 | 3 | 5 | 3 | 5 | —[6] | 4 |
| Scratch resistance[2] | 3 | 2.5 | 3 | 5 | 3 | 5 | —[6] | 3 |
| Degree of gloss (60°) before[3] | 55 | 50 | 50 | 50 | 23 | 45 | 50 | 15 |
| Degree of gloss (60°) after[3] | >95 | >95 | >95 | >95 | >95 | >95 | >95 | >95 |
| CCT: 9 cycles −30° C./+25° C.[4] No. of cracks | 1 | 50 | 7 | 13 | 2 | 3 | —[6] | —[6] |
| CCT: 9 cycles −30° C./+25° C. + 36 cycles −20° C./+60° C.[5] No. of cracks | 5 | 50 | 19 | 8 | 15 | 8 | —[6] | —[6] |
| Length of cracks (cm) | 12 | 60 | 59 | 56 | 45 | 32 | —[6] | —[6] |

Notes on Table 3:
[1] practical assessment, the ease of removal of the paint, the life of the sandpaper and similar aspects being taken into account (Rating: 0 = best, 6 = worst)
[2] finger nail scratch test (Rating: 0 = best, 6 = worst)
[3] degree of gloss according to Gardner before and after sanding and polishing of the surface
[4] resistance to cold cracking test: 9 cycles [sic], 1 cycle consisting of storage of the coated panels, in each case 4 h at −30° C. and 4 h at +25° C.
[5] resistance to cold cracking test: 9 cycles at −30° C. for 4 h and at +25° C. for 4 h, followed by 36 cycles at −20° C. for 4 h and at +60° C. for 4 h
[6] surfaces too tacky, measurement not possible

What is claimed is:

1. Coating compositions, comprising a paint component I and a paint component II, wherein component II comprises a curing catalyst, and further wherein component I comprises at least one reactive thinner and at least one unsaturated polyester (A) that is the reaction product of:
   a) 33 to 67 mol % of a dicarboxylic acid component a consisting of:
      $a_1$) 30 to 90 mol % of at least one ethylenically unsaturated aliphatic dicarboxylic acid selected from the group consisting of maleic acid, fumaric acid, itaconic acid, citraconic acid, and mixtures thereof, and
      $a_2$) 10 to 70 mol % of at least one saturated aliphatic dicarboxylic acid having 6 to 10 carbon atoms per molecule;
   b) 33 to 67 mol % of a diol component b consisting of:
      $b_1$) 50 to 100 mol % of at least one member of the group consisting of 1,4-dimethylolcyclohexane and alkyl-substituted 1,4-dimethylolcyclohexanes and
      $b_2$) 0 to 50 mol % of at least one monomeric or oligomeric glycol having 2 or 3 carbon atoms per glycol segment and a number average molecular weight $M_n \leq 500$; and
   c) 0 to 10 mol % of a polyol component c consisting of at least one polyol; with the proviso that the sum of the amounts of the components a to c is 100 mol %.

2. Coating compositions according to claim 1, wherein polyester (A) is the reaction product of:
   a) 50 to 60 mol % of the dicarboxylic acid component a,
   b) 40 to 50 mol % of the diol component b, and
   c) 0 to 5 mol % of the polyol component c.

3. Coating compositions according to claim 1, wherein the dicarboxylic acid component a consists of
- $a_1$) 50 to 70 mol % of at least one ethylenically unsaturated aliphatic dicarboxylic acid selected from the group consisting of maleic acid, fumaric acid, itaconic acid, citraconic acid, and mixtures thereof, and
- $a_2$) 30 to 50 mol % of at least one saturated aliphatic dicarboxylic acid having 6 to 10 carbon atoms per molecule.

4. Coating compositions according to claim 1, wherein the diol component b consists of
- $b_1$) 70 to 100 mol % of at least one component $b_1$ selected from the group consisting of 1,4-dimethylolcyclohexane and alkyl-substituted 1,4-dimethylolcyclohexanes, and
- $b_2$) 0 to 30 mol % of at least one component $b_2$ selected from the group consisting of monomeric and oligomeric glycols having 2 or 3 carbon atoms per glycol segment and a number average molecular weight $M_n \leq 500$.

5. Coating compositions according to claim 1, wherein the ethylenically unsaturated aliphatic dicarboxylic acid is selected from the group consisting of maleic acid, fumaric acid, and mixtures thereof.

6. Coating compositions according to claim 1, wherein the saturated aliphatic dicarboxylic acid is adipic acid.

7. Coating compositions according to claim 1, wherein the component $b_1$ is 1,4-dimethylolcyclohexane.

8. Coating composition according to claim 1, wherein the component $b_2$ selected from the group consisting of monomeric and oligomeric ethylene glycols and propylene glycols.

9. Coating composition according to claim 1, wherein the polyester (A) has an acid value of 10 to 60 mg of KOH/g and an OH value of 5 to 100 mg of KOH/g.

10. Coating composition according to claim 1, wherein the paint component I comprises
- A) 35 to 60% by weight of at least one unsaturated polyester (A),
- B) 0 to 20% by weight of at least one other unsaturated polymer compound,
- C) 29 to 50% by weight of at least one reactive thinner,
- D) 0 to 15% by weight of at least one organic solvent,
- E) 0 to 7% by weight of pigments or fillers, and
- F) 1 to 4% by weight of conventional auxiliary substances and additives, the sum of the amounts by weight of the components A to F in each case being 100% by weight.

11. Process for the coating of wood and wood materials wherein an air-drying coating composition according claim 1, is applied and cured.

12. Process for the coating of materials exposed to temperature fluctuations in further processing, storage or use, comprising applying the coating composition according to claim 1, to said materials and curing the coating thus applied.

* * * * *